June 1, 1965 J. G. ROE 3,186,657

TAPE MEASURE UNIT

Filed July 30, 1963

INVENTOR.
JUSTUS G. ROE

BY

Curtis, Morris & Safford
ATTORNEYS

United States Patent Office 3,186,657
Patented June 1, 1965

3,186,657
TAPE MEASURE UNIT

Justus G. Roe, Sayville, N.Y., assignor to Justus Roe and Sons, Inc., Patchogue, N.Y., a corporation of New York Filed July 30, 1963, Ser. No. 298,788
2 Claims. (Cl. 242—84.8)

This invention relates to an improved tape measure unit and more particularly to an improved tape rewind crank and spool assembly for such a unit.

An object of this invention is to provide an improved tape unit which will never fall apart when dropped.

Another object is to provide a wear compensating rewinding reel or spool arrangement in such a unit whereby constant reel tension is automatically maintained throughout the life of the unit.

Still another object is to provide a reel structure which can easily, quickly and accurately be assembled on a production basis by unskilled workers.

This invention is described in connection with a tape measure having a graduated tape (such as a long steel ribbon), a thin cylindrical case for storage and protection of the tape when not in use, and a reel or spool within the case upon which the tape can be wound. In use, the tape is unwound from the reel until a sufficient length is available to make the required measurement, the measurement is made, and the tape is then wound back onto the reel. Typically, a case of about four inches in diameter will hold a fifty foot tape.

Tape measures, particularly those used by surveyors, carpenters, and construction workers in the field, are often subject to rough and even careless handling. One of the important advantages of the present invention is that it provides a more durable reel structure which will never fall apart when dropped.

Previously, a tape measure unit to which this invention applies had a rewinding spool supported in the case by a center spindle pin. The latter was tapered and fitted into a mating recess in the spool. This arrangement was simple but had the disadvantage of often falling apart when dropped because it relied solely on the force fitting of the spindle pin into the spool to hold these parts together. Furthermore, during assembly at the factory there has been a problem of maintaining exact dimensional tolerances. The reels in some units were too loose, others were too tight. An important advantage of this invention is that the fit of the reel in the case can be easily and accurately controlled. Heretofore, reel tension was primarily determined by the depth to which the spindle pin was forced into the mating recess in the spool. This distance would vary depending upon the force used and upon the minor variations in taper of spindle and spool. Thus, it was difficult to maintain precise control of the reel tension particularly when assembly was on production basis. The improved reel structure of this invention permits much more accurate assembly and provides greater uniformity in reel tension.

In accordance with the invention, the rewinding spool of a tape measure unit is mounted in a case by a spindle and a compression spring retained in relation to each other and the case by a snap ring. The spring automatically compensates for wear and provides a uniform reel winding tension or drag throughout the life of the unit. Furthermore, because of the shock-absorbing action of the spring, and the positive locking of the elements together by the snap ring, this improved unit will not fall apart when struck a sharp blow as by dropping.

A better understanding of the invention together with a fuller appreciation of its many advantages will best be gained from the following description given in connection with the accompanying drawings wherein.

Figure 1:
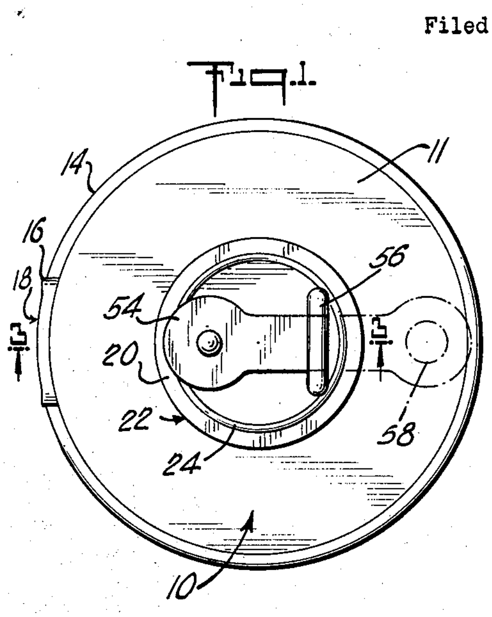
FIGURE 1 is a top view of a tape measure showing its spool and rewinding crank.
Figure 2:
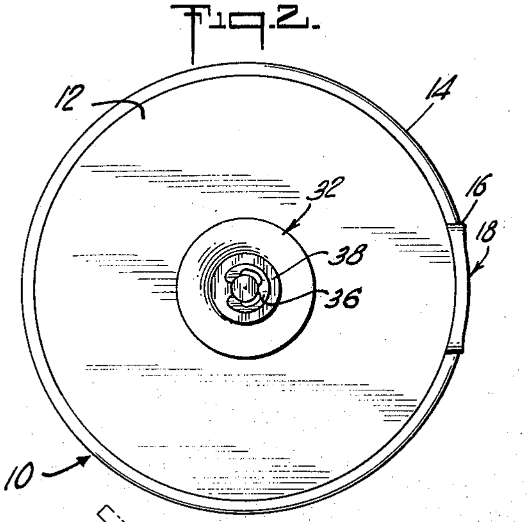
FIGURE 2 is a bottom view of the tape measure.
Figures 3, 4:
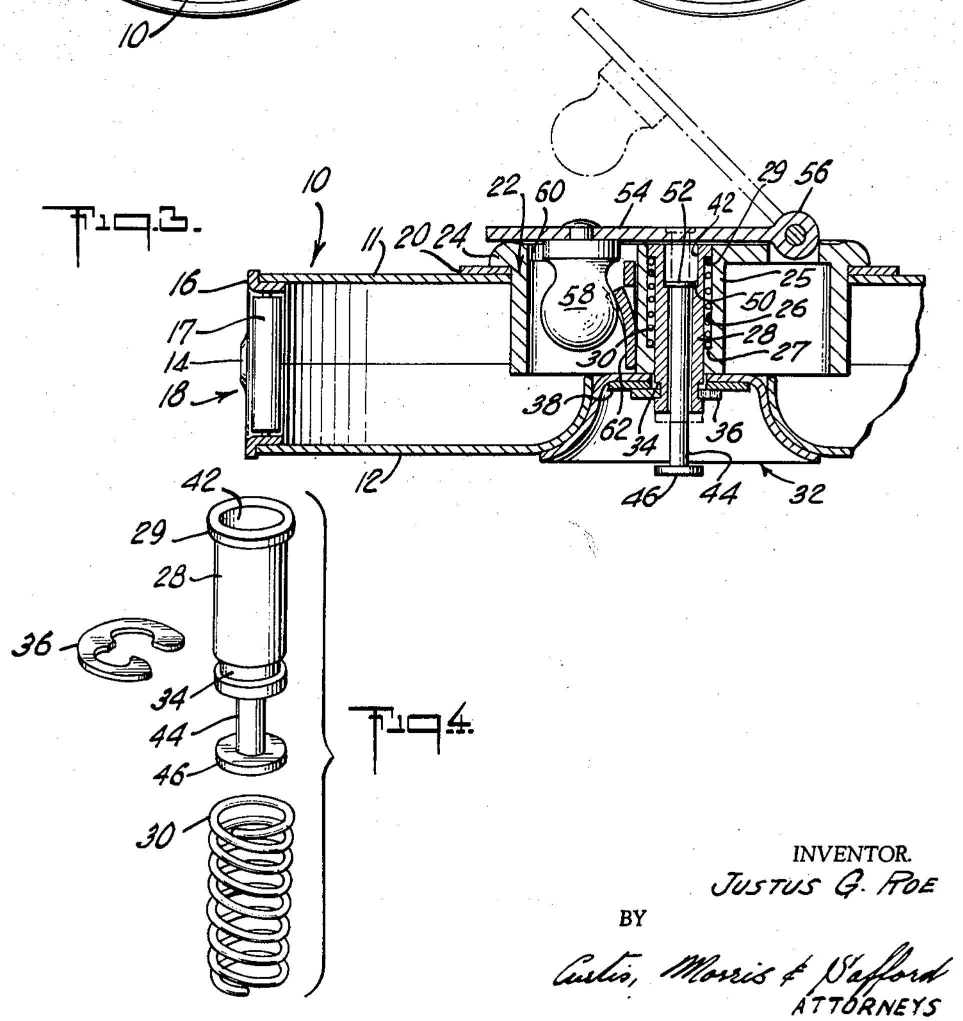
FIGURE 3 is a section view, taken as indicated by lines 3—3 in FIGURE 1, which shows portions of the reel structure and the case.
FIGURE 4 is a perspective view of several components of the reel assembly.

The tape measure 10 shown in FIGURES 1 and 2 is made of two halves 11 and 12 which are joined together by a circumferential band 14 to form a thin hollow housing. The ends of band 14 do not meet but terminate on each side of a rectangular frame 16 which defines an opening 18 in the rim of the case through which a long tape (not shown) may be inserted. As seen in FIGURE 3, there is mounted on one side of frame 16 a roller 17 which acts as a frictionless bearing for the tape as it passes through opening 18.

In FIGURE 3, the upper case half 11 has a center opening surrounded by an annular washer 20. Seated on this washer and projecting into the case is a spool 22 with a flange 24 bearing down against washer 20. Projecting down from the center of spool 22 is a hollow hub 25 having an axial bore 26 which loosely accommodates a hollow spindle 28 (see FIGURE 4) and a helical compression spring 30.

Hub bore 26 has a bottom flange 27 adapted to engage one end of the spring 30, while on spindle 28 there is a flange 29 adapted to engage the other end of spring 30. Thus, when assembled, the spring 30 is compressed between the flanges on spool 22 and spindle 28.

The assembling of the spool and spindle is simple and straight forward. First, spring 30 is dropped into the bore of the spool hub and then spindle 28 is slipped down through the bore and the spring. These elements are then placed in case 10 and the upper end of the spindle is pushed down level with the top of the spool as shown in FIGURE 3. In this position, the lower end of the spindle projects out through the bottom wall of the case and through a washer 38 into a recessed well formed by a cup 32. This lower spindle end, as seen in FIGURE 4, has a retaining groove 34 into which a snap ring 36 fits. By pressing down on the top of spindle in the assembled condition of FIGURE 3, groove 34 is pushed slightly beyond the bottom face of washer 38 of the case in well 32 and snap ring 36 is snapped onto the spindle. Then when the spindle is released, ring 36, now fast on the spindle, will bear against washer 38 and prevent accidental separation of the spool and the spindle.

This arrangement constitutes an effective shock-absorbing interlock since spring 30 will absorb most of the shock to which the reel assembly may be subjected if dropped. Furthermore, the force of spring 30 will accurately control the winding tension of spool 22. Thus, by selecting a spring of appropriate strength the reel tension is set at a suitable value, to resist the uncoiling of the tape on spool 22. Additionally, this arrangement results in automatic compensation for wear taking place at washer 20 and the spool flange 24, and between snap ring 36 and washer 38. As these surfaces wear, the reel tension is maintained by the constant bias of compression spring 30.

Spindle 28 has a bore 42 in which a plunger 44 is slidably mounted. Upward movement of the plunger within the bore is limited in one direction by the abutment of its head 46 against the bottom of spindle 28. Plunger movement in the opposite direction is limited by the interaction of a shoulder 50 inside bore 42 and a flattened or enlarged head 52 of the plunger.

Swingably mounted upon spool 22 by a hinge 56 is a reel winding handle or crank 54 having a knob 58. In the full-line position of FIGURES 1 and 3, winding handle 54 is nested against the side of the spool, with knob 58 positioned in an opening 60 in the spool wall and releasably held in place by a retaining spring 62 mounted against hub 25 of the spool. Handle 54 may be released so that it swings outwardly, as illustrated in broken lines in FIGURE 3, to the extended broken-line position of FIGURE 1. When in that extended position knob 58 is grasped and the handle is turned to rotate the spool and wind the tape. Handle 54 is released and swung from its interengagement with spring 62 by pushing against head 46 of plunger 44 so as to slide the plunger to the broken line position. This movement projects head 52 against the handle and swings the handle outwardly. When the tape has been rewound the handle is swung back to the full-line position of FIGURES 1 and 3, and it remains in that position until released again.

The drawings herein were made from an actual unit 10 and show its various elements substantially to scale. The description of the invention is intended in illustration and not in limitation of it. Various minor changes in the embodiment shown may occur to those skilled in the art and can be made without departing from the spirit or scope of the invention as set forth.

I claim:

1. A tape measure reel comprising a spindle, a circumferential flange formed near one end of said spindle, a circumferential channel formed near the other end of said spindle, a helical compression spring coaxial to said spindle, a first end of said spring engaging said flange, a spool on which a tape can be wound, an axial bore formed in said spool wherein said spindle and said spring are coaxially placed, a circumferential shoulder formed near one end of the axial bore engaging a second end of said spring, a flange formed on the circumference of said spool, a flat hollow case, a first circular opening in one face of said case adapted to receive said spool with an annular surface surrounding said first opening adapted to seat the said flange on the spool, a second opening in the other side of the case adapted to receive the spindle, an annular seat associated with said second opening, a retaining ring engaged in the channel formed in the spindle and engaging said annular seat so that said spring biases the spool and the spindle in axially opposite directions, said bias being effectively resisted by the cooperation of the annular surface and the flange on said spool and by the cooperation of the annular seat and the retaining ring on the spindle, whereby said spring effectively absorbs shock imparted to said spindle and said rail compensates for wear and maintains a relatively constant frictional drag upon turning the spool between said annular surface and said annular flange and between said annular seat and said retaining ring.

2. A tape measure reel comprising a spool, an axial bore within said spool, a first spring seat formed on said spool within said axial bore, a spindle, a second spring seat formed on said spindle, a helical compression spring coaxial with said spool and engaging said first and second spring seats effective to bias said spool and said spindle in opposite directions, a case supporting said spindle and spool in coaxial relation, first means associated with said spool and said case effective to resist said bias, and second means associated with said spindle and said case effective to resist said bias, whereby said spring is effective to absorb any shock imparted to said spindle or said spool and is also effective to compensate for any wear taking place at the interfaces between the said bias resisting means and said case.

References Cited by the Examiner

UNITED STATES PATENTS

| | | | |
|---|---|---|---|
| 645,263 | 3/00 | Keuffel | 242—84.8 |
| 2,934,283 | 4/60 | Astore | 242—84.8 |
| 2,949,832 | 8/60 | Goldhammer | 242—71.4 X |
| 3,044,731 | 7/62 | Zelnick | 242—84.8 |
| 3,098,622 | 7/63 | Bishop et al. | 242—84.8 |

JORDAN FRANKLIN, *Primary Examiner.*